(12) United States Patent
Travostino

(10) Patent No.: US 8,078,730 B2
(45) Date of Patent: Dec. 13, 2011

(54) SYSTEM, DEVICE, AND METHOD FOR MAINTAINING COMMUNICATION SESSIONS IN A COMMUNICATION SYSTEM

(75) Inventor: Franco Travostino, Arlington, MA (US)

(73) Assignee: Rockstar BIDCO, LP, New York, NY (US)

( * ) Notice: Subject to any disclaimer, the term of this patent is extended or adjusted under 35 U.S.C. 154(b) by 642 days.

(21) Appl. No.: 09/748,698

(22) Filed: Dec. 22, 2000

(65) Prior Publication Data
US 2002/0081971 A1    Jun. 27, 2002

(51) Int. Cl.
*G06F 15/16* (2006.01)
(52) U.S. Cl. .......................... 709/227; 709/228
(58) Field of Classification Search .................. 709/201, 709/223–224, 227–228, 230
See application file for complete search history.

(56) References Cited

U.S. PATENT DOCUMENTS

| | | | | |
|---|---|---|---|---|
| 5,592,611 | A * | 1/1997 | Midgely et al. | 714/4 |
| 5,802,258 | A | 9/1998 | Chen | 395/182.08 |
| 5,978,849 | A * | 11/1999 | Khanna | 709/227 |
| 6,061,563 | A * | 5/2000 | Lee | 455/435.1 |
| 6,112,223 | A * | 8/2000 | Chadwick et al. | 709/201 |
| 6,141,690 | A * | 10/2000 | Weiman | 709/228 |
| 6,295,557 | B1 * | 9/2001 | Foss et al. | 709/224 |
| 6,308,174 | B1 * | 10/2001 | Hayball et al. | 707/10 |
| 6,338,054 | B1 * | 1/2002 | Kitamura | 707/1 |
| 6,539,494 | B1 * | 3/2003 | Abramson et al. | 714/4 |
| 6,542,740 | B1 | 4/2003 | Olgaard et al. | |
| 6,546,425 | B1 * | 4/2003 | Hanson et al. | 709/227 |
| 6,598,081 | B1 * | 7/2003 | Coile et al. | 709/227 |
| 6,651,105 | B1 | 11/2003 | Bhagwat et al. | |
| 6,675,208 | B1 | 1/2004 | Rai et al. | |
| 6,680,923 | B1 * | 1/2004 | Leon | 370/328 |
| 6,691,165 | B1 * | 2/2004 | Bruck et al. | 709/227 |
| 6,691,173 | B2 * | 2/2004 | Morris et al. | 709/249 |
| 6,718,383 | B1 * | 4/2004 | Hebert | 709/224 |
| 6,721,805 | B1 | 4/2004 | Bhagwat et al. | |
| 6,763,012 | B1 | 7/2004 | Lord et al. | |
| 6,894,994 | B1 * | 5/2005 | Grob et al. | 370/335 |
| 2002/0068558 | A1 | 6/2002 | Janik | |

OTHER PUBLICATIONS

Mattison, S. et al., "Specification of the Bluetooth System—Core", Specification vol. 1, Dec. 1, 1999.
Lind, P. et al., "Specification of the Bluetooth System—Profiles", Specification vol. 2, Dec. 1, 1999.

* cited by examiner

*Primary Examiner* — Hussein A Elchanti
(74) *Attorney, Agent, or Firm* — Withrow & Terranova, PLLC

(57) ABSTRACT

A communication session is maintained through a disruption by saving state information related to the communication session upon detecting the disruption and subsequently using the saved state information to re-establish the communication session. The communication session may be associated with an access point device in a wireless communication system, and the communication session may be re-established through the same or a different access point device in the wireless communication system.

38 Claims, 5 Drawing Sheets

SYSTEM, DEVICE, AND METHOD FOR MAINTAINING COMMUNICATION SESSIONS IN A COMMUNICATION SYSTEM

CROSS-REFERENCE TO RELATED APPLICATION(S)

The present application may be related to the following commonly owned United States patent application, which is hereby incorporated herein by reference in its entirety:

U.S. patent application Ser. No. 09/747,436 entitled SYSTEM, DEVICE, AND METHOD FOR PROVIDING NETWORK ACCESS IN A COMMUNICATION SYSTEM, filed on even date herewith in the names of Franco Travostino and Robert L. Myers.

FIELD OF THE INVENTION

The present invention relates generally to communication systems, and more particularly to maintaining communication sessions in a communication system.

BACKGROUND OF THE INVENTION

In a typical wireless communication system, wireless terminal equipment (TE) devices access a host computer through various access point (AP) devices. The AP devices communicate with the TE devices using a wireless communication protocol, and communicate with the host computer using some other protocol, such as a local area network (LAN) protocol. Each communication protocol is typically composed of various protocol layers in what is often referred to as a protocol stack. The protocol layers are typically implemented in software, and require certain processing resources as well as certain memory resources (e.g., for the storage of state information and data). The AP devices typically support and implement the full wireless communication protocol stack, and therefore the AP devices are typically complex devices that require substantial processing and memory resources.

One wireless communication protocol is commonly known as Bluetooth. Bluetooth defines a wireless (RF) protocol layer as well as various combinations of higher protocol layers (referred to in Bluetooth as profiles) for using Bluetooth in various applications. Bluetooth is described in a Bluetooth core specification entitled *Specification of the Bluetooth System Core*, Volume 1.0 B, dated Dec. 1, 1999, which is hereby incorporated herein by reference in its entirety. Bluetooth profiles are described in a Bluetooth profiles specification entitled *Specification of the Bluetooth System Profiles*, Volume 1.0 B, dated Dec. 1, 1999, which is hereby incorporated herein by reference in its entirety. For convenience, the Bluetooth core specification and the Bluetooth profiles specification are referred to hereinafter collectively as the Bluetooth specification.

FIG. 1 shows a representation of a conventional wireless communication system 100 in accordance with an implementation of Bluetooth. The TE device 102 accesses the host computer 108 via the AP device 106, using a wireless communication protocol to communicate with the AP device 106 over a wireless medium 104 (e.g., RF through air, infrared through air).

The AP device 106 typically implements the full wireless communication protocol stack. Therefore, the AP device 106 is typically a complex device having substantial processing and memory resources.

FIG. 2 illustrates the various protocol stacks that are supported and implemented by the TE device 102, the AP device 106, and the host computer 108 within the conventional wireless communication system 100 in accordance with a LAN Access Profile of the Bluetooth specification.

The TE device 102 includes, among other things, baseband transceiver logic 202 with associated host controller interface (HCI) firmware 204 for sending and receiving protocol messages over the wireless medium 104, HCI driver logic 206, logical link control and adaptation protocol (L2CAP) logic 208 for providing connection-oriented or connectionless layer 2 services, link manager protocol (LMP) logic 210, service discovery protocol (SDP) logic 212, RF communication logic 214 for emulating multiple RS-232 connections over L2CAP, Point-to-Point Protocol (PPP) logic 216, Internet Protocol (IP) logic 218, TCP/UDP logic 220, and a number of applications 222.

The AP device 106 includes, among other things, a first protocol stack for communicating with the TE device 102 and a second protocol stack for communicating with the host computer 108. The first protocol stack includes, among other things, baseband transceiver logic 224 with associated HCI firmware 226 for sending and receiving protocol messages over the wireless medium 104, HCI driver logic 228, L2CAP logic 230, LMP logic 232, SDP logic 234, RF logic 236, PPP logic 238, IP logic 240, and Dynamic Host Configuration Protocol (DHCP) logic 242. The second protocol stack includes, among other things, LAN logic 244, IP logic 240, Proxy ARP (Address Resolution Protocol) logic 246 for resolving addresses, and AAA (authentication, authorization, and accounting) logic 248.

The host computer 108 includes, among other things, LAN logic 250, IP logic 252, TCP/UDP logic 254, and a number of applications 256.

The wireless communication system typically includes mechanisms by which the AP devices decide which AP device is to handle communications for the TE device. For example, the TE device may be given access to the host computer through the closest AP device based upon some predetermined criteria (e.g., receive signal strength).

During operation of the wireless communication system, it may become necessary or desirable for the TE device to access the host computer through different AP devices at different times. For example, as the TE device moves about within the wireless communication system, the proximity of the TE device to various AP devices changes, making it necessary or desirable to move communications from an old AP device to a new AP device. Similarly, certain network events may disrupt communications between the TE device and the host computer (e.g., a communication failure between the TE device and the AP device, a failure or inactivation of the AP device, or a communication failure between the AP device and the host computer), making it necessary or desirable to move communications from the old AP device to the new AP device.

The wireless communication protocol typically includes mechanisms for moving communications from an old AP device to a new AP device. For convenience, this movement of communications from the old AP device to the new AP device is referred to herein as a "hand-off" from the old AP device to the new AP device. A "hand-off" from the old AP device to the new AP device may involve such things as determining the new AP device for the TE device (e.g., determining the next-closest AP device to the TE device) and moving communications from the old AP device to the new AP device.

Because the AP devices typically implement the full wireless communication protocol, the AP device through which the TE device accesses the host computer typically maintains substantial state information relating to the TE device. When there is a "hand-off" from the old AP device to the new AP device, state information maintained by the old AP device is lost, and the new AP device must re-establish communications for the TE device anew. Thus, the "hand-off" from the old AP device too the new AP device may substantially disrupt communications between the TE device and the host computer. In a Bluetooth wireless communication system implemented according to current specifications, it would not be uncommon for this disruption to last an unacceptably long 5-10 seconds.

SUMMARY OF THE INVENTION

In an embodiment of the present invention, the AP devices work in combination with a back end (BE) device to provide wireless access for the TE devices. Specifically, the wireless communication protocol stack is divided between the AP devices and the BE device, with the AP devices supporting and implementing a first protocol layer of the wireless communication protocol stack (typically the lowest protocol layer of the wireless communication protocol stack), and the BE device supporting and implementing a second protocol layer of the wireless communication protocol stack (typically the upper layers of the wireless communication protocol stack). Each AP device is coupled to the BE device over a communication network, such as an Ethernet LAN, and establishes a communication connection to the BE device. Protocol messages received by the AP devices from the TE devices are forwarded by the AP devices to the BE device over the pre-established communication connections, and protocol messages received by the AP devices from the BE device over the pre-established communication connections are forwarded by the AP devices to the TE devices. The AP devices are therefore "thin" AP (TAP) devices that support and implement only a small subset of the wireless communication protocol stack and therefore require minimal processing and memory resources. This allows the TAP devices to be small, simple, inexpensive devices that can be placed unobtrusively and ubiquitously within a networking environment. The BE device includes sufficient processing and memory resources for supporting many TE devices accessing the network through multiple TAP devices, and communicates with the host computer on behalf of the TE devices. It should be noted that this division of the wireless communication protocol stack between the TAP devices and the BE device is transparent to the TE devices and to the host computer, which require no changes to operate in such a wireless communication system.

When there is a disruption in communication for a particular TE device or a "hand-off" is otherwise desirable or necessary, the BE device saves state information relating to the TE device, and uses the saved state information to subsequently re-establish communication with the TE device through the same or a different TAP device.

A method for maintaining a communication session involves determining that the communication session is disrupted, saving state information relating to the communication session, and subsequently re-establishing the communication session using the saved state information. Determining that the communication session is disrupted may involve monitoring for a predetermined signal and failing to receive the predetermined signal for a predetermined amount of time. Saving the state information relating to the communication session may involve saving the state information for up to a predetermined amount of time. The communication session may be associated with an access point device, and the communication session may be re-established through the same or a different access point device.

A device for maintaining a communication session includes session monitoring logic for determining that the communication session is disrupted, state maintenance logic for saving state information relating to the communication session, and session re-establishment logic for subsequently re-establishing the communication session using the saved state information. Determining that the communication session is disrupted may involve monitoring for a predetermined signal and failing to receive the predetermined signal for a predetermined amount of time. Saving the state information relating to the communication session may involve saving the state information for up to a predetermined amount of time. The communication session may be associated with an access point device, and the communication session may be re-established through the same or a different access point device. The device may be a back end device that implements upper protocol layers of a wireless communication protocol, such as Bluetooth.

A computer program for controlling a computer system to maintain a communication session includes session monitoring logic for determining that the communication session is disrupted, state maintenance logic for saving state information relating to the communication session, and session re-establishment logic for subsequently re-establishing the communication session using the saved state information. Determining that the communication session is disrupted may involve monitoring for a predetermined signal and failing to receive the predetermined signal for a predetermined amount of time. Saving the state information relating to the communication session may involve saving the state information for up to a predetermined amount of time. The communication session may be associated with an access point device, and the communication session may be re-established through the same or a different access point device. The device may also include protocol logic for implementing upper protocol layers of a wireless communication protocol, such as Bluetooth.

A communication system includes a number of access point devices that each implement a lower protocol layer of a wireless communication protocol and a back end device that implements upper protocol layers of the wireless communication protocol on behalf of the number of access point devices. The back end device saves state information for a communication session upon detecting a disruption of the communication session and subsequently re-establishes the communication session using the saved state information. The communication session may be associated with an access point device, and the back end device may re-establish the communication session through the same or a different access point device. The communication session may be associated with a terminal equipment device that communicates with the back end device through an access point device, in which case the back end device may determine that the communication session is disrupted upon failing to receive a predetermined signal from the terminal equipment device for a predetermined amount of time.

DETAILED DESCRIPTION OF A PREFERRED EMBODIMENT

Figure 1:
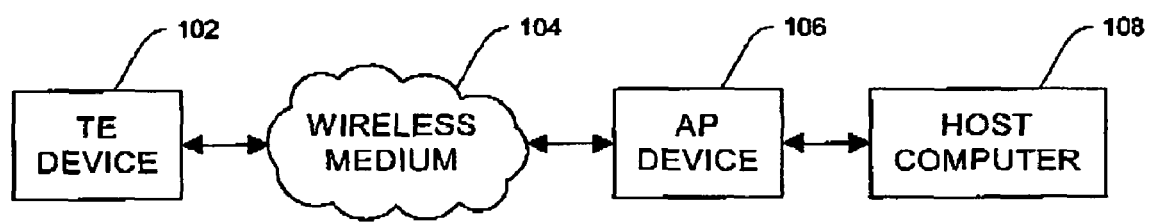
FIG. 1 is a system diagram showing an example of a conventional wireless communication system.

In an embodiment of the present invention, the AP devices work in combination with a back end (BE) device to provide wireless access for the TE devices. Specifically, the wireless communication protocol stack is divided between the AP devices and the BE device, with the AP devices supporting and implementing a first protocol layer of the wireless communication protocol stack (typically the lowest protocol layer of the wireless communication protocol stack), and the BE device supporting and implementing a second protocol layer of the wireless communication protocol stack (typically the upper layers of the wireless communication protocol stack). Each AP device is coupled to the BE device over a communication network, such as an Ethernet LAN, and establishes a communication connection to the BE device. Protocol messages received by the AP devices from the TE devices are forwarded by the AP devices to the BE device over the pre-established communication connections, and protocol messages received by the AP devices from the BE device over the pre-established communication connections are forwarded by the AP devices to the TE devices. The AP devices are therefore "thin" AP (TAP) devices that support and implement only a small subset of the wireless communication protocol stack and therefore require minimal processing and memory resources. This allows the TAP devices to be small, simple, inexpensive devices that can be placed unobtrusively and ubiquitously within a networking environment. The BE device includes sufficient processing and memory resources for supporting many TE devices accessing the network through multiple TAP devices, and communicates with the host computer on behalf of the TE devices. It should be noted that this division of the wireless communication protocol stack between the TAP devices and the BE device is transparent to the TE devices and to the host computer, which require no changes to operate in such a wireless communication system.

Bluetooth is one wireless communication system that can benefit from such division of the wireless communication protocol stack between the AP devices and the BE device. Bluetooth is a wireless access protocol that uses multiple AP devices spread throughout a networking environment to provide wireless access for portable TE devices. The effectiveness of the Bluetooth communication system is dependent to a large degree on the number and placement of the AP devices within the networking environment. Increased performance can be realized by increasing the number of AP devices. Because the AP devices are typically complex devices having substantial processing and memory resources, increasing the number of AP devices substantially increases the overall cost of the communication system. However, by using TAP devices that are small, simple, and inexpensive, it is possible to increase the number of AP devices without unduly increasing the overall cost of the communication system. For convenience, various embodiments of the invention are described herein in the context of a Bluetooth wireless communication system.

In an embodiment of the present invention, the wireless communication protocol stack (e.g., Bluetooth) is divided between TAP devices and a BE device. Each TAP device establishes a communication connection to the BE device. In a typical embodiment, the TAP devices communicate with the BE device over an Ethernet LAN, and the pre-established communication connections are Point-to-Point Protocol (PPP) connections that are established using a PPP-over-Ethernet (PPPoE) control protocol (referred to hereinafter as PPP/PPPoE communication connections). Protocol messages received by the TAP devices from the TE devices are forwarded by the TAP devices to the BE device over the pre-determined PPP/PPPoE communication connections, and protocol messages received by the TAP devices from the BE device over the pre-determined PPP/PPPoE communication connections are forwarded by the TAP devices to the TE devices.

Figure 3:
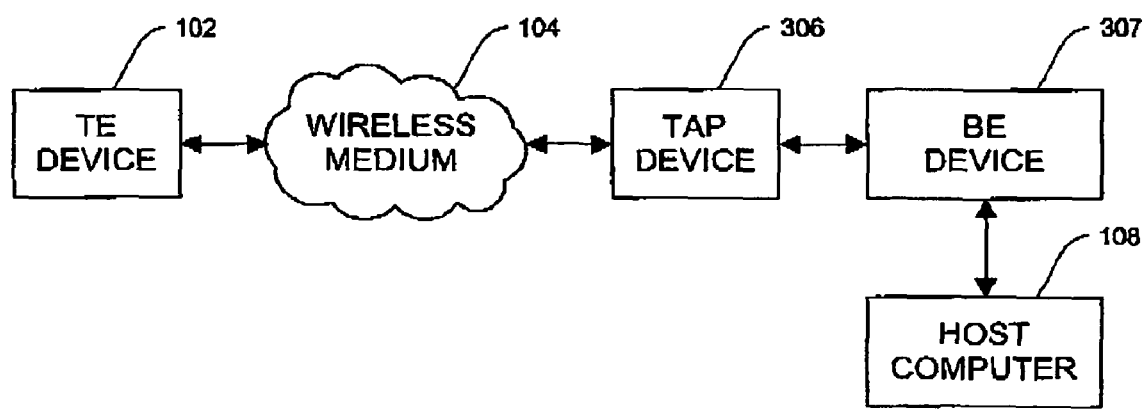
FIG. 3 is a system diagram showing an example of a wireless communication system in which an access point device implements a lower protocol layer of a wireless communication protocol and a back end device implements upper protocol layers of the wireless communication protocol in accordance with an embodiment of the present invention.

FIG. 3 shows a representation of a wireless communication system 300 in which the Bluetooth wireless communication protocol stack is divided between TAP devices and a BE device. The TE device 102 accesses the host computer 108 via the TAP device 306 using the Bluetooth wireless communication protocol. The TAP device 306 establishes a PPP/PPPoE communication connection to the BE device 307. Protocol messages received by the TAP device 306 from the TE device 102 are forwarded by the TAP device 306 to the BE device 307 over the pre-determined PPP/PPPoE communication connection, and protocol messages received by the TAP device 306 from the BE device 307 over the pre-determined PPP/PPPoE communication connection are forwarded by the TAP device 306 to the TE device 102. The BE device 307 includes sufficient processing and memory resources for supporting the TE device 102 and may other TE devices (not shown) accessing the network through the TAP device 306 and other TAP devices (not shown), and communicates with the host computer 108 on behalf of the TE device 102.

Figure 2:
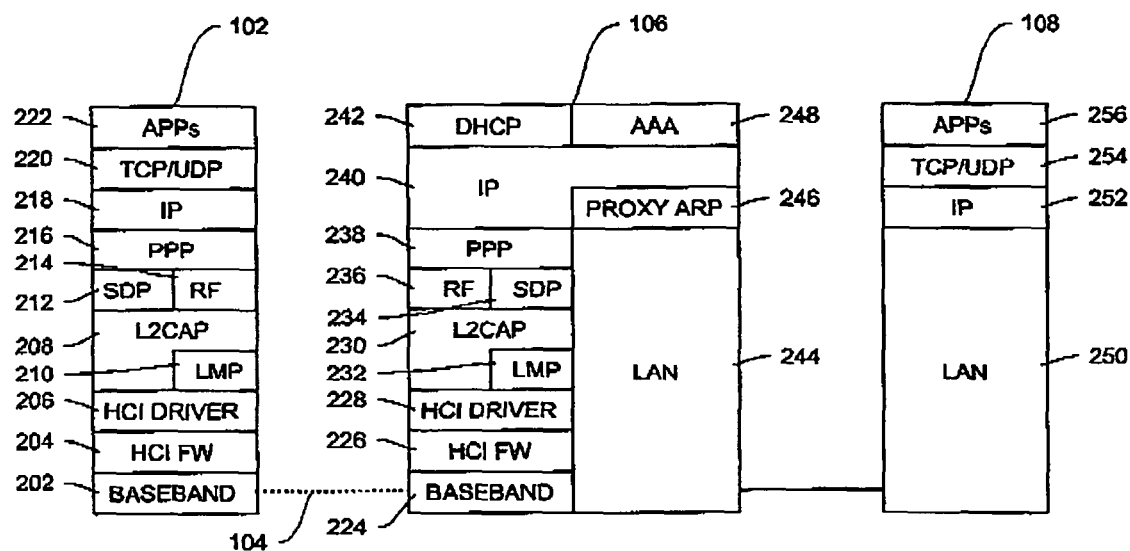
FIG. 2 is a block diagram showing sample protocols stacks of various devices in a conventional wireless communication system.
Figure 4:
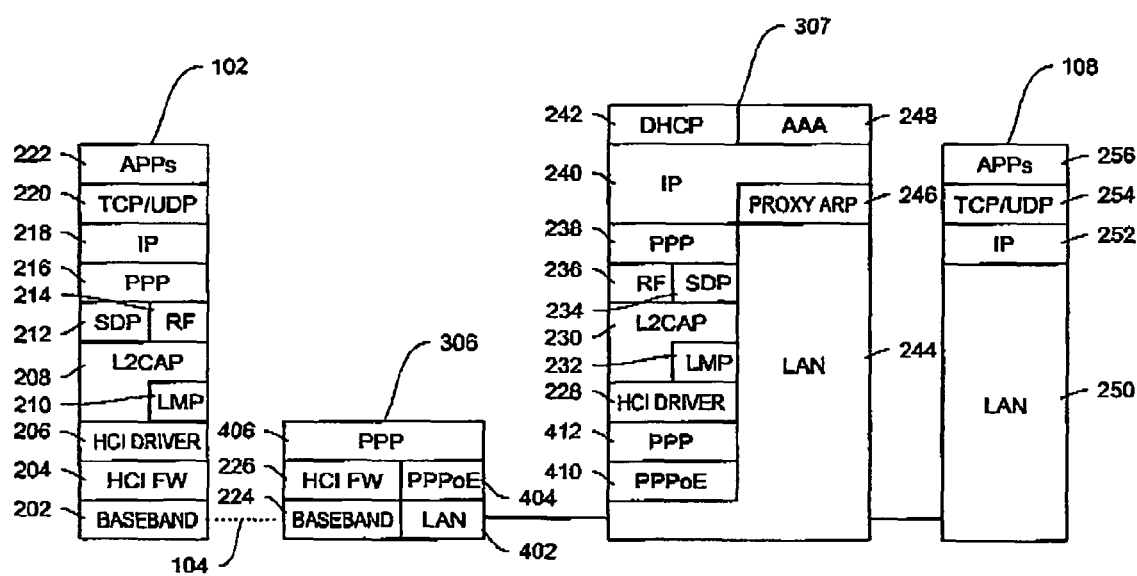
FIG. 4 is a block diagram showing sample protocol stacks of the access point device and the back end device in accordance with an embodiment of the present invention.

FIG. 4 illustrates the various protocol stacks that are supported and implemented by the TE device 102, the TAP device 306, the BE device 307, and the host computer 108 within the wireless communication system 300 in accordance with a LAN Access Profile of the Bluetooth specification. It should be noted that the protocol stacks in both the TE device 102 and the host computer 108 are the same in both the conventional communication system 100, as shown in FIG. 2, and the communication system 300, as shown in FIG. 4.

The TE device 102 includes, among other things, baseband transceiver logic 202 with associated HCI firmware 204 for sending and receiving protocol messages over the wireless medium 104, HCI driver logic 206, L2CAP logic 208, LMP logic 210, SDP logic 212, RF logic 214, PPP logic 216, IP logic 218, TCP/UDP logic 220, and a number of applications 222.

The TAP device 306 includes, among other things, a first protocol stack for communicating with the TE device 102 and a second protocol stack for communicating with the BE device 307. The first protocol stack implements the lower protocol layer of the wireless communication protocol, and includes, among other things, baseband transceiver logic 224 with associated HCI firmware 226 for sending and receiving protocol messages over the wireless medium 104. The second protocol stack includes, among other things, LAN logic 402, PPPoE control protocol logic 404 for establishing a PPP/PPPoE communication connection to the BE device 307 over the LAN, and PPP logic 406 for transferring protocol messages between the TE device 102 and the BE device 307.

The BE device 307 includes, among other things, a first protocol stack for communicating with the TAP device 306 and a second protocol stack for communicating with the host computer 108. The first protocol stack implements the PPP/PPPoE protocols for communicating with the TAP device 306 and also implements the upper protocol layers of the wireless communication protocol, and includes, among other things, LAN logic 244, PPPoE control protocol logic 410, PPP logic 412, HCI driver logic 228, L2CAP logic 230, LMP logic 232, SDP logic 234, RF logic 236, PPP logic 238, IP logic 240, and DHCP logic 242. The second protocol stack includes LAN logic 244, proxy ARP logic 246, and AAA logic 248.

The host computer 108 includes, among other things, LAN logic 250, IP logic 252, TCP/UDP logic 254, and a number of applications 256.

As described in the related application entitled SYSTEM, DEVICE, AND METHOD FOR PROVIDING NETWORK ACCESS IN A COMMUNICATION SYSTEM, which was incorporated by reference above, the TAP device 306 and the BE device 307 interoperate to enable communication between the TE device 102 and the host computer 108. Specifically, protocol messages received by the TAP device 306 from the TE device 102 are forwarded by the TAP device 306 to the BE device 307 over the pre-established communication connection, and protocol messages received by the TAP device 306 from the BE device 307 over the pre-established communication connection are forwarded by the TAP device 306 to the TE device 102.

It should be noted that the TAP device 306 includes very little logic, and the logic that is included in the TAP device 306 is not required to maintain substantial state information. Essentially, the TAP device 306 is only responsible for managing radio frequencies, amplifying signal over noise, performing retransmissions, establishing and maintaining the PPP/PPPoE connection to the BE device, and transferring protocol messages between the TE devices and the BE device. State information required by the TAP device 306 includes such things as PPP/PPPoE session identifier and settings (e.g., MTU), baseband retransmission state, and ACL/SCO mappings and channel properties for the LMP. Certain state information, such as the PPP/PPPoE session identifier and settings and the ACL/SCO mappings and channel properties are maintained by the BE device 307, and can therefore be recovered by the TAP device 306 from the BE device 307 rather than maintained by the TAP device 306.

On the other hand, the BE device 307 includes substantial logic and maintains substantial state information. The BE device 307 provides or may provide various state-based services. DHCP services typically include such things as reserving/allocating IP address for the TE devices and optimizing for use/re-use of the IP address space. AAA services may include such things as implementing an AAA client, implementing a remote AAA server, or implementing whole server functionality (e.g., for sharing policy information with other BE devices via a distributed file system). Proxy ARP services typically include returning TE device MAC addresses in response to queries received from the host computer. SDP services typically include such things as maintaining a database of services (such as Bluetooth services) and processing queries to the database (e.g., keyed on the TAP device from which the query is received). RF services typically include tracking existing sessions over the RS-232 emulation. PPP services typically include maintaining session identifier and settings (e.g., MTU) for PPP connections between the TE devices and the BE device. LMP services typically include such things as a link key, encryption status, encryption key, encryption key size, QoS classes, and hold/sniff/park toggles. L2CAP services typically include such things as packet reassembly, upper-protocol and lower-protocol state machines, connection information for connection-oriented channels, and MTU and QoS classes. PPP/PPPoE services typically include maintaining session identifier and settings for the PPP/PPPoE connections to the TAP devices. Additional services may include such things as network address translation (NAT), firewall functionality, configuration/management services (e.g., via SNMP), and BE device pooling (i.e., maintaining multiple BE devices for aggregation and load balancing).

During operation of the wireless communication system, communications between the TE device 102 and the BE device 307 via the TAP device 306 may be disrupted. Such a disruption may be caused, for example, by a failure or inactivation of the TE device 102, movement of the TE device 102 away from the TAP device 306, a communication failure between the TE device 102 and the TAP device 306 (e.g., obstruction or interference), a failure or inactivation of the TAP device 306, a communication failure between the TAP device 306 and the BE device 307 (e.g., a LAN failure), or a failure of the BE device 307.

In an embodiment of the invention, when the BE device 307 determines that communication with the TE device 102 has been disrupted, the BE device 307 saves state information for the TE device 102 rather than, for example, terminating communication with the TE device 102 and simply dropping all state information relating to the TE device 102. The BE device 307 uses the saved state information to subsequently re-establish communication with the TE device 102. The BE device 307 may re-establish communication with the TE device 102 through the same TAP device 306 or through another TAP device. In order to prevent the state information from becoming "stale," the BE device 307 typically saves the state information for up to a predetermined amount of time, after which the state information is dropped and is not used to re-establish communications with the TE device 102.

In an embodiment of the present invention, the BE device 307 determines that communication with the TE device 102 has been disrupted based upon a "heartbeat" signal that is transmitted by the TE device 102. Specifically, in accordance with Bluetooth, the TE device 102 typically transmits a periodic "heartbeat" signal. Among other things, the "heartbeat" signal indicates to the BE device 307 that the TE device 102 is active and that there is a communication path from the TE device 102 through to the BE device 307. The BE device 307 monitors for this "heartbeat" signal from the TE device 102. If the BE device 307 fails to receive the "heartbeat" signal from the TE device 102 for a predetermined amount of time, then the BE device 307 determines that communication with the TE device 102 has been disrupted. Such a failure to receive the "heartbeat" signal from the TE device 102 may be caused, for example, by a failure or inactivation of the TE device 102, movement of the TE device 102 away from the TAP device 306, a communication failure between the TE device 102 and the TAP device 306 (e.g., obstruction or interference), a failure or inactivation of the TAP device 306, a communication failure between the TAP device 306 and the BE device 307 (e.g., a LAN failure), or a failure of the BE device 307.

Similarly, during operation of the wireless communication system, it is sometimes necessary or desirable to perform a "hand-off" from one TAP device to another TAP device. For example, a "hand-off" may be necessary or desirable due to movement of the TE device 102 away from the TAP device 306 or interference affecting communication between the TE device 102 and the TAP device 306.

In an embodiment of the present invention, when the BE device 307 determines that a "hand-off" is necessary or desirable, the BE device 307 saves the state information for the TE device 102 and uses the saved state information to subsequently re-establish communication with the TE device 102. The BE device 307 may re-establish communication with the TE device 102 through the same TAP device 306 or through another TAP device. In order to prevent the state information from becoming "stale," the BE device 307 typically saves the state information for up to a predetermined amount of time, after which the state information is dropped and is not used to re-establish communications with the TE device 102.

In a conventional wireless communication system in which state information is not saved for use in re-establishing communication with the TE device, a "hand-off" is an expensive operation in terms of time and disruption to communications. Therefore, in such a conventional wireless communication system, a "hand-off" is typically performed only when necessary.

In an embodiment of the present invention in which the BE device 307 saves state information for the TE device 102 and uses the state information to subsequently re-establish communication with the TE device 102, a "hand-off" is a less expensive operation in terms of time and disruption to communications. Therefore, in various embodiments of the present invention, "hand-offs" may be used more liberally without unduly disrupting communications.

Thus, when performed in accordance with an embodiment of the present invention, "hand-offs" may be used to move TE devices among and between the various TAP devices to support various types of operations that would otherwise have been impractical in a conventional wireless communication system. Because the BE device 307 saves state information for the TE device 102 and uses the state information to re-establish communication with the TE device 102, the "hand-offs" can be completed quickly and with relatively little disruption to communication.

One type of operation is congestion avoidance. For example, assuming the TE device 102 is able to communicate through two (or more) TAP devices at a particular time, a "hand-off" may be used to dynamically move the TE device 102 from a congested TAP device to an uncongested TAP device.

Another type of operation is load balancing. For example, assuming the TE device 102 is able to communicate through two (or more) TAP devices at a particular time, a "hand-off" may be used to dynamically move the TE device 102 from one TAP device to another TAP device based upon load balancing concerns.

Yet another type of operation is for supporting multiple overlapping systems. For example, the wireless communication service may be provided through multiple overlapping systems from the same or different service providers. A "hand-off" may be used to dynamically move the TE device 102 to a preferred system or service provider when the TE device 102 is able to communicate with the preferred system or service provider, although the TE device 102 may be given access through a different system or service provider when the TE device 102 is unable to communicate with the preferred system or service provider.

Still another type of operation is cost control. For example, the TE device 102 may be charged for accessing the wireless communication system, with different charges applying to different TAP devices. A "hand-off" may be used to dynamically move the TE device 102 from a more expensive TAP device to a less expensive TAP device when the TE device 102 is able to communicate through the less expensive TAP device.

In any case, when the BE device 307 detects a disruption or determines that a "hand-off" is otherwise necessary or desirable, the BE device 307 saves state information for the TE device 102 and uses the saved state information for subsequently re-establishing communication with the TE device 102 through the same or a different TAP device.

In the event that the BE device 307 re-establishes communication with the TE device 102 over the same TAP device 306, there is essentially no change within the BE device 307. The state information for the TE device 102 is associated with the same TAP device 306 and the same PPP/PPPoE communication connection.

In the event that the BE device 307 re-establishes communication with the TE device 102 over a new TAP device, the BE device 307 essentially re-maps the state information from the old TAP device to the new TAP device. Thus, the state information for the TE device 102 is associated with the new TAP device and its corresponding PPP/PPPoE communication connection. Certain state information maintained by the old TAP device, such as retransmission state information, is lost during this "hand-off," although the retransmission state information is not needed by the new TAP device or by the BE device 307 in order to restore communication with the TE device 102. Certain state information maintained by the old TAP device, such as ACL/SCO mappings and channel properties, may be recovered by the new TAP device from the BE device 307, which also maintains such information. Thus, such information is not lost during the "hand-off" from the old TAP device to the new TAP device.

Figure 5:
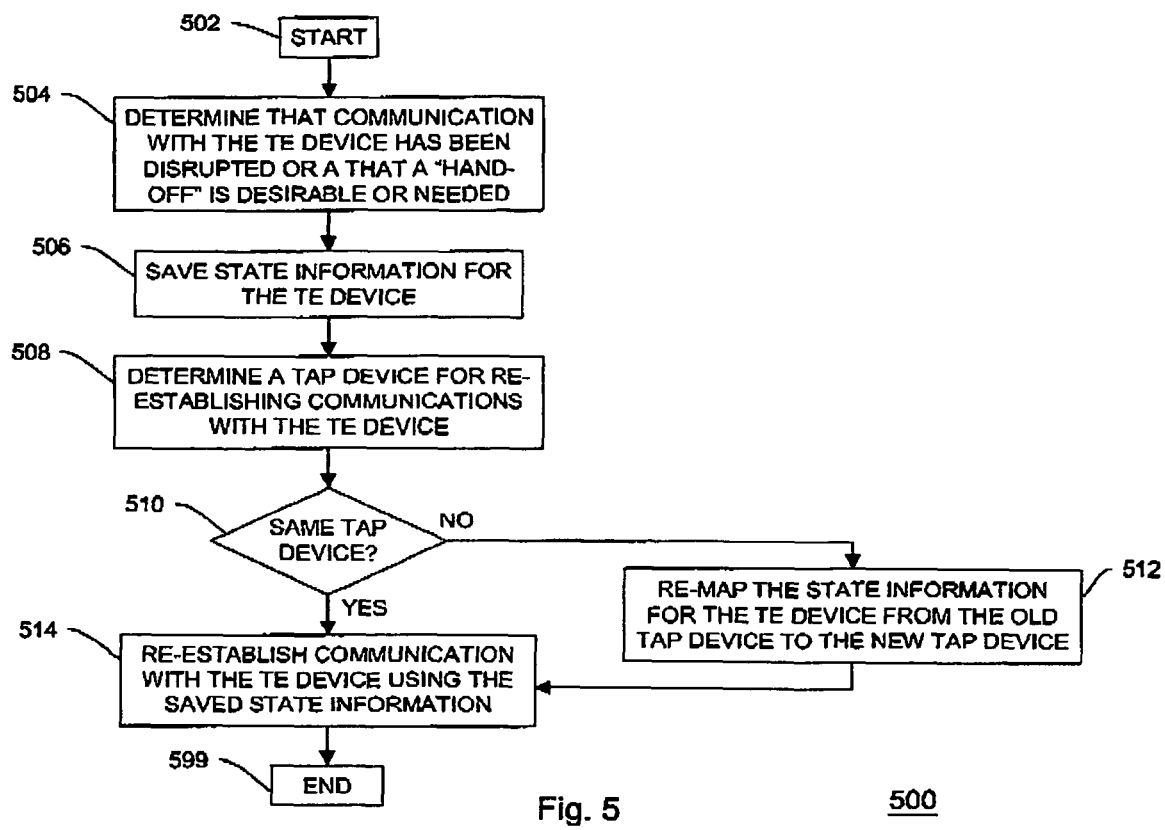
FIG. 5 illustrates logic for maintaining state information for a TE device during a disruption or hand-off in accordance with an embodiment of the present invention.

FIG. 5 shows sample BE device logic 500 for maintaining state information for the TE device 102 during a disruption or "hand-off." Beginning at block 502, and upon determining that communication with the TE device has been disrupted or that a "hand-off" is desirable or needed, in block 504, the logic saves state information for the TE device, in block 506. Upon determining a TAP device for re-establishing communications with the TE device, in block 508, the logic determines whether the TAP device for re-re-establishing communications with the TE device is the same TAP device or a different TAP device, in block 510. If the TAP device for re-establishing communications with the TE device is the same TAP device (YES in block 510), then the logic re-establishes communication with the TE device using the saved state information, in block 514. If the TAP device for re-establishing communications with the TE device is a different TAP device (NO in block 510), then the logic re-maps the state information for the TE device from the old TAP device to the new TAP device, in block 512, and re-establishes communication with the TE device using the saved state information, in block 514. The logic 500 terminates in block 599.

The ability of the BE device 307 to save state information for the TE device 102 enables other types of operations that are tangentially related to the "hand-off" procedure. Specifically, the BE device 307 may save state information and other information (e.g., date/time, TAP identification information) for purposes other than, or in addition to, re-establishing communication with the TE device 102. Among other things, the saved information may be used for accounting purposes (e.g., monitoring network access, monitoring network usage, billing), network management purposes (e.g., traffic loading evaluation, congestion control, network planning), user tracking purposes (e.g., tracking and logging user positions and movements for security, auditing, and other reasons, for example, to determine where an intruder is or has been), and user locating purposes (e.g., locating the TE device 102 based upon the TAP device through which the TE device 102 is communicating, for example, to find a user in an emergency situation), to name but a few.

It should be noted that the protocol stacks shown and described with reference to FIG. 2 and FIG. 4 are exemplary of the LAN Access Profile of the Bluetooth specification. However, the present invention can be applied to other Bluetooth profiles as well as to other communication protocols and profiles. Typically, embodiments implementing other Bluetooth profiles require appropriate changes to at least the upper protocol layers of the TE device 102 and the BE device 307.

In the described embodiments, the TAP devices are coupled to the BE device over an Ethernet LAN and communicate with the BE device using PPP/PPPoE communication connections. However, the present invention is in no way limited by the way in which the TAP devices communicate with the BE device. The TAP devices can communicate with the BE device using any of a variety of communication technologies and protocols.

Although various aspects of the present invention are described with reference to a Bluetooth wireless communication protocol, various alternative embodiments of the invention may use other protocols, including modifications and derivations of the Bluetooth wireless communication protocol.

It should be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the BE device logic is implemented as a set of computer program instructions that is converted into a computer executable form, stored as such in a computer readable medium, and executed by a microprocessor within the BE device 307 under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for facilitating communication between a wireless terminal device and a first wireless access point, the method comprising:
   determining that communication session connectivity between the terminal device and the first wireless access point has or will be disrupted;
   saving first state information relating to the communication session connectivity between the terminal device and the wireless access point in a back end device, the back end device being distinct from and capable of communication with multiple access point devices, the back end device operable to contemporaneously save state information relating to multiple communication sessions associated with multiple wireless access point devices;
   communicating the first saved state information from the back end device back to the first wireless access point; and
   utilizing the first saved state information, by the first wireless access point, to facilitate communication between the terminal device and the first wireless access point.

2. The method of claim 1, wherein determining that the communication session has or will be disrupted comprises:
   determining that the communication session has failed.

3. The method of claim 1, wherein determining that the communication session has failed comprises:
   monitoring for a predetermined signal; and
   failing to receive the predetermined signal for a predetermined amount of time.

4. The method of claim 1, wherein determining that the communication session has or will be disrupted comprises:
   determining that disrupting the communication session is necessary or desirable.

5. The method of claim 1, wherein saving the state information relating to the communication session comprises:
   saving the state information for up to a predetermined amount of time.

6. The method of claim 1, wherein the communication session is associated with a first access point device and wherein re-establishing the communication session using the saved state information comprises reestablishing the communication through the first access point device.

7. The method of claim 1, including preventing failure of a communication session using the saved state information.

8. The method of claim 1, wherein the communication session comprises a Bluetooth communication session.

9. A device for facilitating communication between a wireless terminal device and a first wireless access point, the device being distinct from and capable of communication with the first access point and comprising:
   a non-transitory computer usable medium having a computer readable program code embodied therein, said computer readable program code executed to implement:
      session monitoring logic which determines that communication session connectivity between the terminal device and the first wireless access point has or will be disrupted;
      state maintenance logic operably coupled to save first state information relating to connectivity between the terminal device and the first wireless access point, the state maintenance logic contemporaneously saving state information relating to multiple communication sessions associated with multiple wireless access point devices; and
      communication logic which communicates the first saved state information to the first wireless access point;
   whereby the first wireless access point can utilize the saved state information to facilitate communication between the terminal device and the first wireless access point.

10. The device of claim 9, wherein the session monitoring logic is operably coupled to determine that the communication session has failed.

11. The device of claim 10, wherein the session monitoring logic is operably coupled to monitor for a predetermined signal and determine that the communication session has failed upon failing to receive the predetermined signal for a predetermined amount of time.

12. The device of claim 9, wherein the session monitoring logic is operably coupled to determine that disruption of the communication session is necessary or desirable.

13. The device of claim 9, wherein the state maintenance logic is operably coupled to save the state information for up to a predetermined amount of time.

14. The device of claim 9, including session re-establishment logic operably coupled to re-establish a communication session through the access point device using the saved state information.

15. The device of claim 9, including session logic operably coupled to use the saved state information to prevent failure of a communication session.

16. The device of claim 9, wherein the communication session comprises a Bluetooth communication session.

17. The device of claim 9, wherein the device is a back end device that implements upper protocol layers of a wireless communication protocol.

18. The computer program of claim 9, wherein the communication session comprises a Bluetooth communication session.

19. A computer program for facilitating communication between a wireless terminal device and a first wireless access point, the computer program being executed at least in-part by a back end device which is distinct from and capable of communication with the first access point and stored on a non-transitory computer storage medium, said computer program being executed by a computing device and comprising:
   session monitoring logic programmed to determine that communication session connectivity between the terminal device and the first wireless access point has or will be disrupted;
   state maintenance logic programmed to save state information relating to the communication session connectivity between the terminal device and the first wireless access point, the state maintenance logic operable to contemporaneously save state information relating to multiple communication sessions associated with multiple wireless access point devices; and
   communication logic programmed to communicate the saved state information to the first wireless access point;
   whereby the first wireless access point can utilize the saved state information to facilitate communication between the terminal device and the first wireless access point.

20. The computer program of claim 19, wherein the session monitoring logic is programmed to determine that the communication session has failed.

21. The computer program of claim 20, wherein the session monitoring logic is programmed to monitor for a predetermined signal and determine that the communication session has failed upon failing to receive the predetermined signal for a predetermined amount of time.

22. The computer program of claim 19, wherein the session monitoring logic is programmed to determine whether disruption of the communication session is necessary or desirable.

23. The computer program of claim 19, wherein the state maintenance logic is programmed to save the state information for up to a predetermined amount of time.

24. The computer program of claim 19, including session reestablishment logic that re-establishes the communication session through the access point device using the saved state information.

25. The computer program of claim 19, including session logic that prevents failure of a communication session through the access point device using the saved state information.

26. The computer program of claim 19, further comprising:
    protocol logic for implementing upper protocol layers of a wireless communication protocol.

27. A communication system that facilitates communication between a wireless terminal device and a first wireless access point comprising:
    a number of wireless access point devices, including the first wireless access point, that each implement a first protocol layer of a wireless communication protocol; and
    a back end device that implements a second protocol layer of the wireless communication protocol on behalf of the number of access point devices, wherein the back end device is distinct from the access point devices and operably coupled to save state information relating to connectivity of a communication session between the terminal device and the first wireless access point upon determining that the communication session connectivity has or will be disrupted and subsequently to communicate the saved state information back to the first access point, the back end device operable to contemporaneously save state information relating to multiple communication sessions associated with multiple wireless access point devices;
    whereby the first wireless access point can utilize the saved state information to facilitate communication between the terminal device and the first wireless access point.

28. The communication system of claim 27, wherein the communication session is associated with an access point device, and wherein the back end device is operably coupled to re-establish the communication session through the access point device.

29. The communication system of claim 27, wherein the communication session is associated with an access point device, and wherein the back end device is operably coupled to re-establish the communication session through a different access point device.

30. The communication system of claim 29, wherein the back end device is operably coupled to associate the saved state information with the different access point device.

31. The communication system of claim 27, wherein the wireless communication protocol comprises a Bluetooth wireless communication protocol.

32. The communication system of claim 31, wherein the first protocol layer is a lower protocol layer of the Bluetooth wireless communication protocol, and wherein the second protocol layer comprises an upper protocol layer of the Bluetooth wireless communication protocol.

33. The communication system of claim 27, wherein the communication session is associated with a terminal equipment device that communicates with the back end device through an access point device, and wherein the back end device is operably coupled to determine that the communication session is disrupted upon failing to receive a predetermined signal from the terminal equipment device for a predetermined amount of time.

34. A method for facilitating communication between a terminal device and a first access point device, where the terminal device accesses a communication network through one of a plurality of wireless access point devices that implement a first protocol layer of a wireless communication protocol and a back end device that implements a second protocol layer of the wireless communication protocol the method comprising:
    saving state information for the terminal device by the back end device which is distinct from and capable of communication with the first access point device, the state information relating to connectivity of a communication session between the terminal device and the first wireless access point, the back end device operable to contemporaneously save state information relating to multiple communication sessions associated with multiple wireless access point devices;
    terminating communication with the terminal device over the first access point device;
    communicating the saved state information from the back end device to the first wireless access point; and
    utilizing the saved state information, by the first wireless access point, to facilitate communication between the terminal device and the first wireless access point.

35. The method of claim 34, wherein the first access point device is congested, and including re-establishing communication with the terminal device using the saved state information in response to congestion at the first access point device.

36. The method of claim 34, including re-establishing communication with the terminal device using the saved state information for load balancing purposes to split network traffic between the first access point device and a second access point device.

37. The method of claim 36, wherein the first access point device and the second access point device are in different service provider systems.

38. The method of claim 37, wherein re-establishing communication with the terminal device over the second access point device using the saved state information is done for cost purposes to move the terminal device to a less expensive access point device.

* * * * *